(12) United States Patent
Hirose

(10) Patent No.: US 7,477,456 B2
(45) Date of Patent: Jan. 13, 2009

(54) ZOOM LENS

(75) Inventor: Takuma Hirose, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 266 days.

(21) Appl. No.: 11/523,898

(22) Filed: Sep. 20, 2006

(65) Prior Publication Data

US 2007/0070495 A1 Mar. 29, 2007

(30) Foreign Application Priority Data

Sep. 26, 2005 (JP) .............................. 2005-277874
Mar. 30, 2006 (JP) .............................. 2006-092857

(51) Int. Cl.
 G02B 15/14 (2006.01)
 G02B 15/177 (2006.01)
 G02B 15/00 (2006.01)
 G02B 17/00 (2006.01)

(52) U.S. Cl. .................. 359/689; 359/687; 359/688; 359/682; 359/676; 359/754; 359/776

(58) Field of Classification Search ............... 359/362, 359/392, 557, 656–661, 676, 681, 682, 684, 359/686–692, 754–776, 784–788, 797
See application file for complete search history.

(56) References Cited

U.S. PATENT DOCUMENTS

| | | | | |
|---|---|---|---|---|
| 5,054,897 A * | 10/1991 | Ozawa | .................. | 359/680 |
| 5,268,792 A * | 12/1993 | Kreitzer et al. | .............. | 359/676 |
| 6,342,974 B1 * | 1/2002 | Usui | .......................... | 359/687 |
| 6,525,886 B1 * | 2/2003 | Lewis | ......................... | 359/691 |
| 6,636,361 B2 * | 10/2003 | Wada | .......................... | 359/680 |
| 7,079,326 B2 * | 7/2006 | Hirakawa | ................... | 359/682 |
| 7,167,320 B2 * | 1/2007 | Ohashi | ....................... | 359/687 |
| 7,215,485 B2 * | 5/2007 | Hirose | ....................... | 359/687 |
| 7,405,887 B2 * | 7/2008 | Iwasawa | ..................... | 359/691 |
| 2002/0060858 A1 * | 5/2002 | Wada | ......................... | 359/739 |
| 2004/0030640 A1 * | 2/2004 | Mahnken et al. | ............. | 705/39 |
| 2004/0136087 A1 * | 7/2004 | Hirakawa | ................... | 359/689 |
| 2006/0146419 A1 * | 7/2006 | Hirose | ....................... | 359/684 |
| 2006/0193062 A1 * | 8/2006 | Ohashi | ....................... | 359/689 |
| 2007/0024984 A1 * | 2/2007 | Iwasawa | ..................... | 359/680 |
| 2007/0070495 A1 * | 3/2007 | Hirose | ....................... | 359/362 |
| 2007/0183042 A1 * | 8/2007 | Mizuguchi | ................. | 359/557 |

FOREIGN PATENT DOCUMENTS

JP 2002-372667 12/2002
JP 2003-050352 2/2003

* cited by examiner

Primary Examiner—Bernard E Souw
(74) Attorney, Agent, or Firm—Cohen Pontani Lieberman & Pavane LLP

(57) ABSTRACT

A zoom lens includes in the order from an object a first lens group having a negative refractive power, including at least one negative lens and one positive lens, wherein a negative plastic lens having one or more aspherical surfaces is arranged on a side closest to the object; a second lens group having positive refractive power, including a first positive lens, a second positive lens and a negative lens in the order from the object; and a third lens group, wherein each lens group is moved in a direction of an optical axis for zooming, and the following expressions are satisfied:

$$2.0 < |f1/fw| < 3.0$$

$$1.2 < |f1a/fw| < 1.8$$

where f1, f1a and fw represent focal lengths of the first lens group, of the negative plastic lens arranged closest to the object, and at a wide-angle end of an entire zoom lens, respectively.

19 Claims, 9 Drawing Sheets

F3.18

-0.2  +0.2
SPHERICAL
ABERRATION

ω = 31.2°

-0.2  +0.2
ASTIGMATISM

ω = 31.2°

-0.5%  +0.5%
DISTORTION

F4.16

-0.2  +0.2
SPHERICAL
ABERRATION

ω = 18.1°

-0.2  +0.2
ASTIGMATISM

ω = 18.1°

-0.5%  +0.5%
DISTORTION

F5.56

-0.2  +0.2
SPHERICAL
ABERRATION

ω = 11.3°

-0.2  +0.2
ASTIGMATISM

ω = 11.3°

-0.5%  +0.5%
DISTORTION

F3.18

-0.2    +0.2
SPHERICAL
ABERRATION

ω= 32.4°

-0.2    +0.2
ASTIGMATISM

ω= 32.4°

-0.5%   +0.5%
DISTORTION

F4.05

-0.2    +0.2
SPHERICAL
ABERRATION

ω= 19.2°

-0.2    +0.2
ASTIGMATISM

ω= 19.2°

-0.5%   +0.5%
DISTORTION

F5.54

-0.2    +0.2
SPHERICAL
ABERRATION

ω= 11.3°

-0.2    +0.2
ASTIGMATISM

ω= 11.3°

-0.5%   +0.5%
DISTORTION

F3.18

SPHERICAL ABERRATION

ω= 31.0°

ASTIGMATISM

ω= 31.0°

DISTORTION

F4.12

SPHERICAL ABERRATION

ω= 18.4°

ASTIGMATISM

ω= 18.4°

DISTORTION

F5.66

SPHERICAL ABERRATION

ω= 11.1°

ASTIGMATISM

ω= 11.1°

DISTORTION

F3.18
-0.2 +0.2
SPHERICAL ABERRATION

ω = 31.2°
-0.2 +0.2
ASTIGMATISM

ω = 31.2°
-0.5% +0.5%
DISTORTION

F4.05
-0.2 +0.2
SPHERICAL ABERRATION

ω = 18.5°
-0.2 +0.2
ASTIGMATISM

ω = 18.5°
-0.5% +0.5%
DISTORTION

F5.53
-0.2 +0.2
SPHERICAL ABERRATION

ω = 11.2°
-0.2 +0.2
ASTIGMATISM

ω = 11.2°
-0.5% +0.5%
DISTORTION

ZOOM LENS

This application is based on Japanese Patent Application Nos. 2005-277874 filed on Sep. 26, 2005 and 2006-092857 filed on Mar. 30, 2006, which are incorporated hereinto by reference.

BACKGROUND OF THE INVENTION

The present invention relates to a zoom lens, particularly to a zoom lens preferably used in a compact image sensor having a zoom ratio of three used in a digital still camera or video camera.

The widespread use of a personal computer in recent years has increased the frequency of handling image data through the use of the personal computer. It has also increased the demands for a digital still camera and others for capturing the image data. The spread of such digital still cameras has required the advent of a less expensive digital still camera. It has become essential to achieve a further cost reduction than the image pickup optical system. In the meantime, the number of pixels of the photoelectric conversion device tends to increase every year, the optical pickup system is required to provide higher performances. This trend requires the industry to meet the mutually conflicting requirements of cost reduction and performance upgrading. An example of the CCD zoom lens for meeting such a demand is found in the following Japanese Patent Application Publication Nos. 2002-372667 and 2003-50352.

The zoom lens proposed in the Japanese Patent Application Publication No. 2002-372667 achieves cost reduction by using a plastic lens in the second group. However, the proportion of the plastic lenses used in the constituent lenses is insufficient to achieve cost reduction. In the meantime, the zoom lens proposed in the Japanese Patent Application Publication No. 2003-50352 achieves cost reduction by using plastic lenses in various groups. However, the zoom ratio is as small as 2 through 2.5, and there is still room for improvement in the optical specifications as a zoom lens in recent years.

SUMMARY OF THE INVENTION

The object of the present invention is to solve the aforementioned problems and to provide a compact, high-quality and less costly zoom lens suited particularly to a digital camera by effective arrangement of the plastic lens.

The aforementioned object can be achieved by any one of the following Structures 1 to 19.

A zoom lens of the Structure 1 comprises three lens groups including the first lens group having negative refractive power, the second lens group having positive refractive power and the third lens group, in that order as viewed from the side of an object. In the zoom lens wherein each lens group is moved in the direction of optical axis to vary the power, the aforementioned first lens group contains at least one negative lens and one positive lens. The aforementioned second lens group contains a positive 21 lens, a positive 22 lens and a negative 23 lens in that order as viewed from the object. At the same time, a negative plastic lens having one or more aspherical surfaces is arranged on the side of the aforementioned first lens group closest to the object. Assuming that the focal length of the aforementioned first lens group is f1, the focal length of the plastic lens arranged closest to the object in the aforementioned first lens group is f1a, and the focal length at the wide-angle end of the entire system is fw, the following equations can be satisfied:

$$2.0 < |f1/fw| < 3.0 \quad (1)$$

$$1.2 < |f1a/fw| < 1.8 \quad (2)$$

In an optical system wherein the negative group precedes as in the present invention, the valid diameter of the negative lens (referred to as "1a") arranged closest to the object in the first lens group tends to increase. However, an increase in the valid diameter of the negative lens 1a tends to produce distortion. To correct the distortion, it is possible to design the negative lens 1a to have an aspherical surface, thereby minimizing the distortion.

Although a glass-molded aspherical surface lens provided with an aspherical surface can be used as the negative lens 1a, it is technologically difficult to produce a concave lens having an aspherical surface with a diameter as large as that of the negative lens 1a. This involves a problem of increased production cost.

To solve this problem, the present invention uses a plastic lens having an aspherical surface is used as a negative lens 1a to reduce the production cost below the cost of producing a glass-molded aspherical surface lens. The plastic lens is produced by injection molding or other similar molding method. Even if the surface is aspherical, the production thereof is easier than that of a spherical surface, and hardly requires a cost increase. Thus, in the present invention using plastic lenses in various groups, at least one of the surfaces in each group is preferably aspherical. More preferably, both surfaces are aspherical. This structure permits effective correction of distortion and astigmatism.

The zoom lens of the present invention is characterized by an effective arrangement of aspherical surfaces on each group. Furthermore, assuming that the focal length of the aforementioned first lens group is f1, the focal length of the plastic lens arranged closest to the object in the aforementioned first lens group is f1a, and the focal length at the wide-angle end of the entire system is fw, the following equations can be satisfied:

$$2.0 < |f1/fw| < 3.0 \quad (1)$$

$$1.2 < |f1a/fw| < 1.8 \quad (2)$$

This arrangement ensures effective correction of the aberration resulting from the use of the plastic lens material having a lower refractive index.

Equation (1) defines the refractive power of the first lens group. Meeting the Equation (1) provides the zoom lens with sufficiently compact configuration and satisfactory image forming performance. When the value of the Equation (1) has reduced below the lower limit, aberrations occurring to the first lens group will be increased. Particularly, this will make it difficult to ensure effective correction of distortion in the wide-angle end, magnification and color aberration, and spherical aberration at the telephoto end. Conversely, if the value of the Equation exceeds the upper limit, the powder of the first lens group will be reduced. This will makes it difficult to provide a compact configuration of the entire lens system.

Further, the Equation (2) defines the focal length of the negative lens 1a of the first lens group having a negative focal length. Meeting this Equation (2) ensures compatibility between compact configuration and satisfactory optical performance, even if the lens is plastic lens. If the value of the Equation (2) exceeds the upper limit, and the angle will widen, and the power of the negative lens 1a will increase. This will lead to hypercorrection of the spherical aberration and astigmatism in the first lens group, with the result that the fluctuation of the aberration at the time of zooming will be increased. In the meantime, if the value of the Equation (2) is reduced below the lower limit, the power of the negative lens 1a will become insufficient although this is advantageous in widening the angle. Correction of the aberration will result in an increase in the thickness of the first lens group as well as an increase in the size.

Further, effective correction of the spherical aberration and comatic aberration in the second lens group can be achieved when the positive, positive and negative lenses are included in that order as viewed from the object. Reduction of the light level of the negative lens will decrease the Petzval sum and will minimize the curvature of the image surface. Further, use of two positive lenses reduces the positive power of each lens, and minimizes the spherical aberration and comatic aberration occurring to the positive lens. Further, even if eccentricity occurs during the process of assembling, the fluctuation of aberration caused thereby can be reduced, whereby satisfactory productivity can be maintained.

The zoom lens of the Structure 2 is the same as that in the Structure 1 except that the aforementioned first lens group consists of one negative lens and one positive lens.

The zoom lens of the Structure 3 is the same as that in the Structure 1 except that the aforementioned first lens group consists of two negative lenses and one positive lens.

The aforementioned first lens group is preferably made of two lenses including a negative lens (L1) and positive lens (L2) arranged in that order as viewed from the object, or three lenses including a negative lens (L1), negative lens (L2) and positive lens (L3) arranged in that order as viewed from the object. For example, an arrangement of two lenses as in the first, second or fourth Example forms a compact optical system characterized by a smaller lens thickness and smaller front lens system. Further, arrangement of three lens in the third Example to be described later reduces the negative power by dividing it into smaller fragments, and ensures effective correction of the negative distortion produced in the first lens group.

The zoom lens of the Structure 4 is the same as the zoom lens of any one of the lenses in Structures 1 through 3 except that the positive lens of the aforementioned first lens group is a plastic lens.

If a plastic lens having a negative refractive power is arranged on the side of the aforementioned first lens group closed to the object, the object will be out of focus due to a change in the refractive index due to temperature and humidity. If an attempt is made to get the same level of refractive index as that of glass because of this or because of a lower refractive index, the curvature radius of the surface must be reduced, with the result that a lens cannot be formed, or there will be an increased in the amount of aberration produced. Hence, the aberration cannot be corrected easily.

In the zoom lens of the present invention, as in the first and second Examples to be described later, the positive lens (L2) forming a pair with the negative lens (L1) is made of a plastic material. This arrangement reduces the synthetic power of the plastic lens, and reduces the deviation of focus under the influence of a change in the refractive index due to temperature and humidity. Similarly, in the third Example to be described later, the negative lens (L1) and positive lens (L3) forming a pair with the negative lens (L2) are also made of plastic material, whereby the adverse effect of the temperature is minimized.

The zoom lens of Structure 5 is the same as that in any one of the Structures 1 through 4 except that the aforementioned first lens group consists of the plastic lens alone.

The zoom lens of Structure 6 is the same as that in any one of the Structures 1 through 5 except that the positive 21 lens, positive 22 lens and negative 23 lens of the aforementioned second lens group are the glass-made spherical surface lenses finished by polishing.

The positive lens 21 made of the glass-made spherical surface lens finished by polishing allows the lens material of high refractive index to be selected. This provides compact configuration of the entire optical system.

The zoom lens of Structure 7 is the same as that in any one of the Structures 1 through 6 except that the positive 21 lens of the aforementioned second lens group meets the following Equation:

$$0.5 < |f21/f2| < 1.5 \qquad (3)$$

where f21 denotes the focal length of the positive 21 lens and f2 indicates the focal length of the second lens group.

Equation (3) defines the refractive power of the positive lens 21 arranged on the side closest to the object in the second lens group. Meeting this Equation provides sufficiently compact configuration and satisfactory image forming performance. When the value of the Equation (3) has increased over the upper limit, the power of the second lens group will be too weak and this will make it difficult to achieve a compact configuration of the entire optical system. Further, if the value of the Equation (3) has reduced below the lower limit, the power of the positive lens 21 lens will become excessive. This makes it difficult to correct the spherical aberration and comatic aberration. Meeting the following Equation will provide a more preferable result:

$$0.8 < |f21/f2| < 1.2 \qquad (3')$$

The zoom lens of Structure 8 is the same as that in any one of the Structures 1 through 7 except that the aforementioned second lens group has a cemented lens formed by bonding the aforementioned positive 22 lens with the aforementioned negative 23 lens.

The zoom lens of Structure 9 is the same as that in any one of the Structures 1 through 8 except that the aforementioned second lens group is provided with a plastic lens containing the aspherical surface on at least one surface of the second lens group closest to the image.

An aspherical lens is provided on the surface of the second lens group closest to the image. This arrangement ensures effective correction of astigmatism. Using a plastic lens as this lens will facilitate addition of an aspherical surface by injection molding, and will reduce the weight of the entire lens system. If a glass-made spherical surface lens finished by polishing is employed as the lens other than the following aspherical surface lens in the second lens group the aforementioned positive lens 21, it is possible to reduce the curvature radius error and waviness at the time of manufacturing, as compared with the case of using a glass-molded lens formed by mold formation or the plastic lens by injection molding. Thus, excellent optical performances are provided.

If the positive lens 21 containing a highly convex surface is arranged on the side closest to the object in the second lens group, it is possible to reduce the angle of refraction of the off-center axis light diverged in the first lens group, thereby minimizing various forms of off-center axis aberration.

The zoom lens of Structure 10 is the same as that in any one of the Structures 1 through 9 except that the following Equation is met assuming that the focal length of the aforementioned second lens group is f2:

$$1.5 < |f2/fw| < 2.5 \qquad (4)$$

The Equation (4) defines the refractive power of the second lens group. Meeting this Equation ensures compatibility between compact configuration and satisfactory optical performance. When the value of the Equation (4) has increased over the upper limit, the power of the second lens group will be too weak and the distance of the movement of the second lens group required for variable power will be increased. This will make it difficult to achieve a compact configuration. Conversely, if the value of the Equation (4) has reduced below the lower limit, the power of the second lens group will become excessive. This will increase various forms of aberration produced in this group. Meeting the following Equation will provide a preferable result:

$$1.6<|f2/fw|<2.0 \tag{4'}$$

The zoom lens of Structure 11 is the same as that in any one of the Structures 1 through 10 except that the aforementioned third lens group is provided with positive refractive power.

The zoom lens of Structure 12 is the same as that in any one of the Structures 1 through 11 except that the aforementioned third lens group has at least one plastic lens.

The zoom lens of Structure 13 is the same as that in any one of the Structures 1 through 12 except that the aforementioned third lens group consists of only one positive lens.

The zoom lens of Structure 14 is the same as that in any one of the Structures 1 through 13 except that the following condition is met wherein f3 indicates the focal length of the aforementioned third lens group:

$$2.0<|f3/fw|<5.0 \tag{5}$$

The Equation (5) defines the refractive power of the third lens group. Meeting this condition provides a sufficiently compact configuration and satisfactory image forming performance. When the value of the Equation (5) has increased over the upper limit, the back focus will increase and the distance of the movement of the third lens group at the time of focusing increases. This will increase the total length to bring about unfavorable results. If the value of the Equation (5) has reduced below the lower limit, more distortion and curvature on the image surface will occur to the third lens group. Correction will become difficult even if the aspherical surface is used in the third lens group. Meeting the following Equation will provide a preferable result:

$$2.2<|f3/fw|<3.0 \tag{5'}$$

The zoom lens of Structure 15 is the same as that in any one of the Structures 1 through 14 except that each of the aforementioned lens groups has at least one plastic lens and the plastic lens contains at least one aspherical surface, thereby cutting down the zoom lens product cost reduction.

The zoom lens of Structure 16 is the same as that in any one of the Structures 1 through 15 except that the distance between the aforementioned lens groups is changed in such a way as to ensure that the distance between the aforementioned first lens group and second lens group is reduced when power is varied from the wide angle side to the telephoto side, and the distance between the aforementioned second lens group and third lens group is increased, whereby power is varied.

The zoom lens of Structure 17 is the same as that in any one of the Structures 1 through 16 except that the aforementioned third lens group moves forward to the object along the optical axis when power is varied from the wide angle side to the telephoto side.

The third lens group moves forward to the object along the optical axis when power is varied from the wide angle side to the telephoto side. This arrangement provides the third lens group with a zooming function, thereby reducing the power or traveling distance of the second lens group.

The zoom lens of Structure 18 is the same as that in any one of the Structures 1 through 17 except that focusing is applied from an object at infinity to an object at short distance by the movement of the aforementioned first lens group or third lens group along the optical axis.

When capturing an image from an object at infinity to an object at short distance using the zoom lens of the present invention, focusing is carried out by the movement of the first lens group or third lens group. When the first lens group or third lens group is composed of only the plastic lens lighter than glass, it becomes possible to decrease the load applied to the drive mechanism when moving the first lens group or third lens group in zooming or focusing mode. Further, if the third lens group is made of only one glass-made positive lens, the load given to the drive mechanism can be minimized.

The zoom lens of Structure 19 is the same as that in any one of the Structures 1 through 18 except that the zoom ratio is 2.8 or more.

If the infrared cut filter arranged between the zoom lens and image sensor in the present invention is replaced by a reflection type filter wherein the surface of the low-pass filter is provided with coating treatment, it becomes possible to eliminates the need of separately inserting an absorption type infrared cut filter into the lens system, and to reduced the thickness along the optical axis. This makes it possible to achieve more compact incorporation of the lens groups and filters into the camera body when incorporating them by bringing close to each other.

The "plastic lens" in the present invention is defined as including the lens formed of the material wherein a plastic material is used as a base material and small-diameter particles are dispersed in the plastic material, the volume ratio of the plastic accounting for 50 percent or more. This lens also includes the lens whose surface is provided with coating treatment for the purpose of preventing reflection or improving the surface strength.

BRIEF DESCRIPTION OF THE DRAWINGS

FIGS. 3(A)-1 through 3(C)-3 show aberration curves of the spherical aberration, astigmatism and distortion of the zoom lens of Example 1;

FIGS. 5(A)-1 through 5(C)-3 show aberration curves of the spherical aberration, astigmatism and distortion of the zoom lens of Example 2;

FIGS. 7(A)-1 through 7(C)-3 show aberration curves of the spherical aberration, astigmatism and distortion of the zoom lens of Example 3;

FIGS. 9(A)-1 through 9(C)-3 show aberration curves of the spherical aberration, astigmatism and distortion of the zoom lens of Example 4.

DETAILED DESCRIPTION OF THE PREFERRED EMBODIMENT

Figure 1:
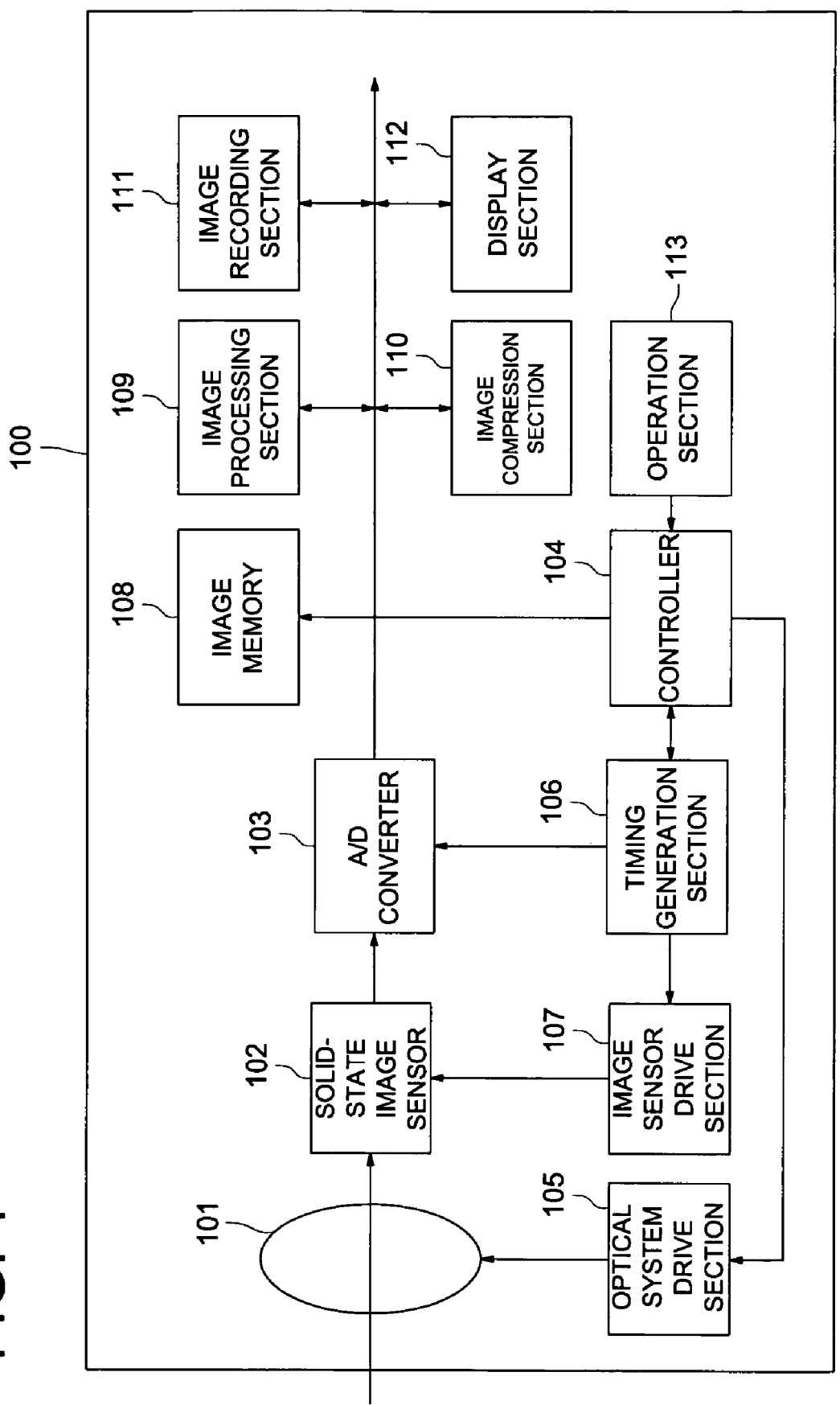
FIG. 1 is a block diagram representing an image pickup device 100.

The following describes the image pickup device 100 provided with a zoom lens as an embodiment of the present invention with reference to FIG. 1. FIG. 1 is a block diagram representing an image pickup device 100.

As shown in FIG. 1, the image pickup device 100 includes a zoom lens 101, a solid-state image sensor 102, an A/D converter 103, a controller 104, an optical system drive section 105, a timing generation section 106, an image sensor drive section 107, an image memory 108, an image processing section 109, an image compression section 110, an image recording section 111, a display section 112 and an operation section 113.

The zoom lens 101 has a function of forming an object image on the image pickup surface of the solid-state image sensor 102. The solid-state image sensor 102 is an image sensor of CCD, CMOS or the like. The incident light is subjected to photoelectric conversion for each of R, G and B, and the analog signal is outputted. The A/D converter 103 converts the analog signal into the digital image data.

The controller 104 controls each portion of the image pickup device 100. The controller 104 includes a CPU (Central Processing Unit), RAM (Random Access Memory) and ROM (Read Only Memory). Various forms of processing are carried out according to various programs read from the RPM and displayed on the ROM, and the CPU.

The optical system drive section 105 drives the zoom lens 101 under the control by the controller 104 in the process of power variation, focusing (movement of the second lens group G2 and third lens group G3 to be described later), exposure and others. The timing generation section 106 outputs the timing for analog signal output. The image sensor drive section 107 controls scanning and driving of the solid-state image sensor 102.

The image memory 108 stores the image data so that the data can be read and written. The image processing section 109 applies various forms of image processing to image data. The image compression section 110 compresses the captured image data according to the compression method such as the method given in the JPEG (Joint Photographic Experts Group). The image recording section 111 records the image data on the recording medium such as a memory card set in a slot (not illustrated).

The display section 112 is exemplified by a color liquid crystal panel, and indicates the image data having been picked up, a through-image prior to image pickup, and various operation screens. The operation section 113 includes release buttons and various operation keys for setting various modes and values, and is used to send the information inputted by the user's operation to the controller 104.

The following describes the operations of the image pickup device 100. In the step of object shooting, object monitoring (through-image display) and image shooting are performed. In the phase of monitoring, the image of the object captured through the zoom lens 101 is formed on the light receiving surface of the solid-state image sensor 102. The solid-state image sensor 102 arranged on the rear of the shooting optical axis of the zoom lens 101 is subjected to scanning and driving operation by the timing generation section 106 and image sensor drive section 107. The analog signal as the output of photoelectric conversion corresponding to the light image formed at a predetermined interval is outputted in the amount equivalent to one screen.

This analog signal is gain-adjusted for each of the primary color components of R, G and B, and is then converted into digital data by the A/D converter 103. The digital data undergoes color processing, including pixel interpolation processing and γ-correction processing by means of an image processing section 109. The luminance signal Y of the digital value and color difference signals Cb and Cr (image data) are generated and stored in the image memory 108. the signal is read out on a periodic basis to generate the video signal, which is then outputted on the display section 112.

This display section 112 works as an electronic finder in the step of monitoring, and displays the image pickup image in real time. In this state, the power variation of the zoom lens 101, focusing and exposure are set by the drive of the optical system drive section 105, based on the use's input operation through the operation section 113, whenever necessary.

In the aforementioned status of monitoring, when wishing to capture a still image, the user operates the release button of the operation section, and still image data is captured. In response to the operation of the release button, one frame of image data stored in the image memory 108 is read out and is compressed by the image compression section 110. The compressed image data is recorded on the recording medium by the image recording section 111.

The aforementioned description of the embodiments and Examples refers to only a few of the examples of the zoom lens and image pickup device of the present invention, without the present invention being restricted thereto.

In the aforementioned embodiments and Examples, a digital still camera was used as an example to describe an image pickup device provided with zoom lens. However, the present invention is not restricted thereto. A portable terminal having at least an image pickup function such as a video camera and mobile phone equipped with image pickup function, PHS (Personal Handyphone System) and PDA (Personal Digital Assistant) can be used as the aforementioned image pickup device.

The following describes the Example of the zoom lens that can be used in the image pickup device 100 given in FIG. 1, without the present invention being restricted thereto. The symbol used in each Example is defined below: In the lens data shown in the following Table, *1, *2, *3 and others indicate plastic lenses.

f: focal length

F: F-number

ω: half viewing angle r: curvature radius of each lens surface d: lens thickness or lens spacing nd: refractive index (with reference to line d)

νd: Abbe's number

In each Example, the shape of aspherical surface can be expressed by the following [Mathematical Formula 1] wherein the vertex of surface is used as an origin, X axis is given along the optical axis, and the height in direction perpendicular to the optical axis is represented by "h".

$$X = \frac{h^2/r}{1+\sqrt{1-(1+\kappa)h^2/r^2}} + \sum_{i=2}^{\infty} A_{2i}h^{2i} \quad \text{[Mathematical Formula 1]}$$

where X is the shape of an aspherical surface (distance along the optical axis from the plane surface in contact with the vertex of surface of an aspherical surface), h is the height in direction perpendicular to the optical axis ($h=\sqrt{Y^2+Z^2}$), r is a paraxial radius of curvature, κ is a conic constant, and $A_{2i}$ is an aspherical surface coefficient.

In the following description (including the lens data in Table), power multiplier of 10 will be expressed as E (e.g. 2.5×10$^{-02}$ will be expressed as 2.5E–02).

EXAMPLE 1

Figure 2:
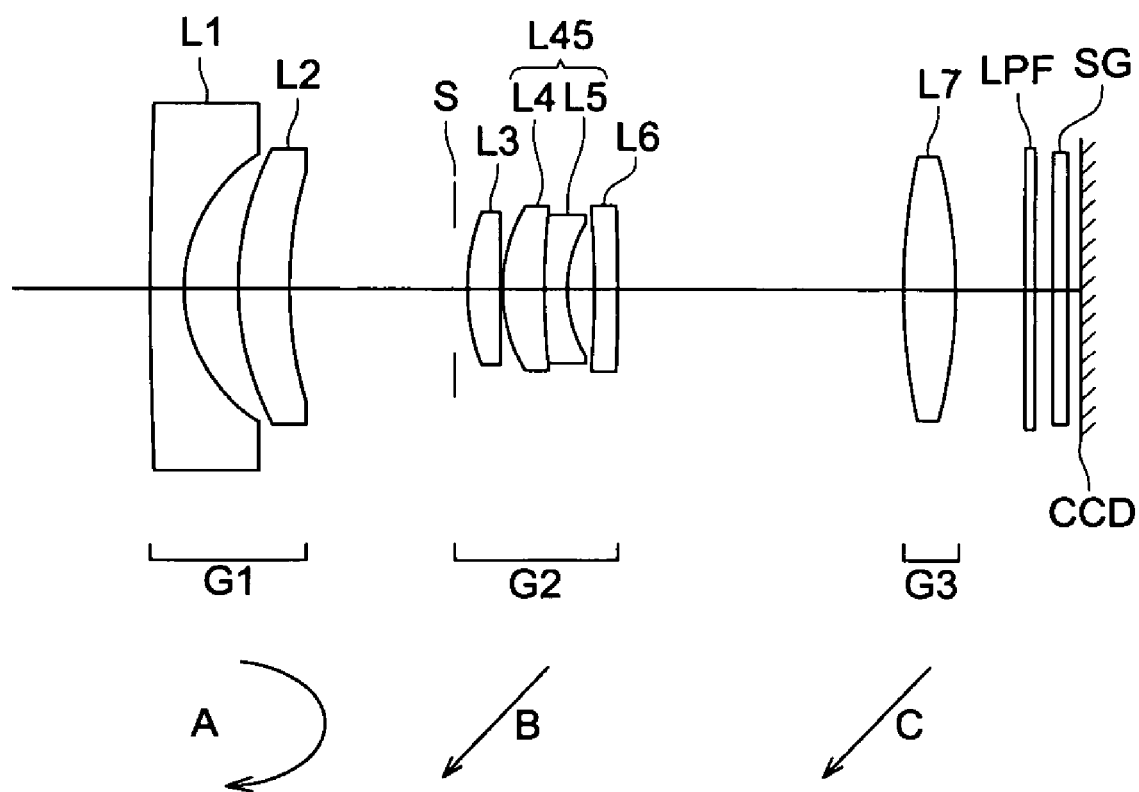
FIG. 2 is a cross sectional view of the zoom lens of Example 1.
Figure 3:
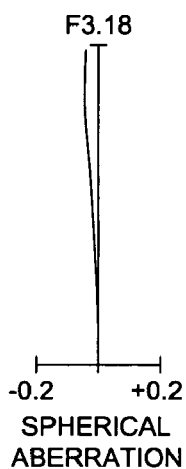
Figure 3:
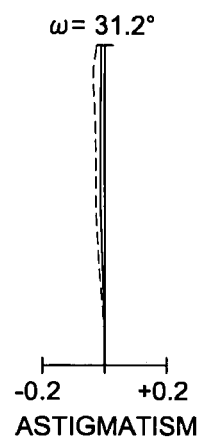
Figure 3:
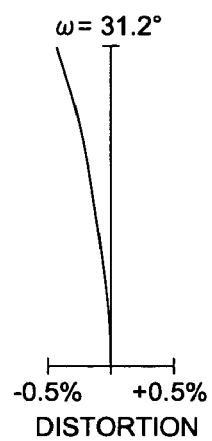
Figure 3:
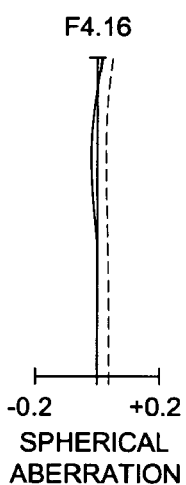
Figure 3:
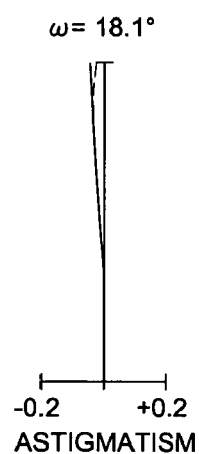
Figure 3:
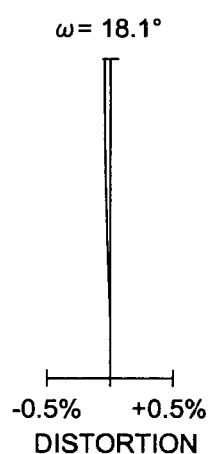
Figure 3:
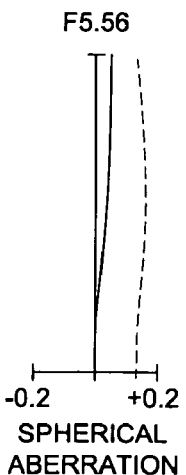
Figure 3:
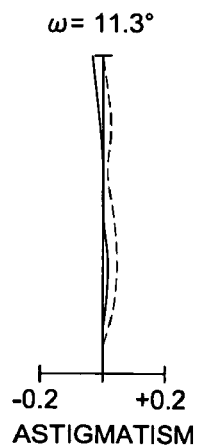
Figure 3:
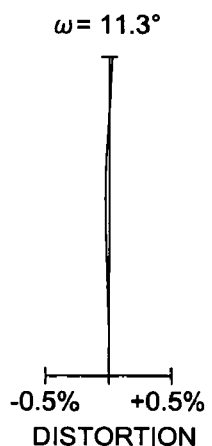

Table 1 shows the lens data of the zoom lens of Example 1. FIG. 2 is a cross sectional view of the zoom lens of Example 1. FIGS. 3(A)-1 through 3(C)-3 show the aberration curve of the spherical aberration, astigmatism and distortion of the zoom lens of Example 1. FIGS. 3(A)-1 through 3(A)-3 indicate the aberration curves on the wide-angle end. FIGS. 3(B)-1 through 3(B)-3 show intermediate aberration curves. FIGS. 3(C)-1 through 3(C)-3 represent the aberration curves for the telephoto end. In the following aberration curves, a solid line indication line d, and a dot denotes line g for spherical aberration curves. For aspherical aberration curves, a solid line indicates a sagittal image surface and a dot indicates a meridional image surface.

TABLE 1

Example 1

| | r | d | nd | νd |
|---|---|---|---|---|
| 1 | −1310.512 | 1.2 | 1.525 | 56.0*1 |
| 2 | 4.912 | 1.92 | | |
| 3 | 7.305 | 1.83 | 1.607 | 27.1*2 |
| 4 | 13.166 | A | | |
| 5 | 9.353 | 1.18 | 1.816 | 46.6 |
| 6 | −598.023 | 0.15 | | |
| 7 | 5.278 | 1.45 | 1.729 | 54.7 |
| 8 | 16.998 | 0.8 | 1.847 | 23.8 |
| 9 | 4.152 | 0.96 | | |
| 10 | −19.288 | 0.8 | 1.525 | 56.0*3 |
| 11 | −20.436 | B | | |
| 12 | 14.32 | 1.81 | 1.525 | 56.0*4 |
| 13 | −23.213 | C | | |
| 14 | | 0.39 | 1.549 | 66.7 |
| 15 | | 0.67 | | |
| 16 | | 0.5 | 1.516 | 64.1 |
| 17 | ∞ | | | |

| 1st surface | | 2nd surface | |
|---|---|---|---|
| κ | 0.0000E+00 | κ | −5.6306E−02 |
| A4 | 4.1561E−04 | A4 | −1.9704E−04 |
| A6 | −6.3696E−06 | A6 | 9.6963E−06 |
| A8 | −1.1698E−07 | A8 | −3.3366E−07 |
| A10 | 1.0792E−09 | A10 | −7.6326E−08 |
| A12 | 3.5112E−11 | A12 | −2.0113E−09 |
| | | A14 | 6.6196E−11 |

| 3rd surface | | 4th surface | |
|---|---|---|---|
| κ | −1.3933E+00 | κ | 0.0000E+00 |
| A4 | −1.4580E−04 | A4 | −5.2258E−04 |
| A6 | 1.6884E−05 | A6 | 4.5587E−06 |
| A8 | −1.0731E−06 | A8 | −2.2192E−06 |
| A10 | −1.4331E−08 | A10 | 1.0235E−07 |
| A12 | 5.8560E−10 | A12 | −2.0335E−09 |

| 10th surface | | 11th surface | |
|---|---|---|---|
| κ | 1.7792E+01 | κ | −9.8488E+00 |
| A4 | 4.8967E−04 | A4 | 1.3250E−03 |
| A6 | 2.9717E−04 | A6 | 2.2438E−04 |
| A8 | −7.9200E−05 | A8 | −3.3328E−05 |
| A10 | 9.2719E−06 | A10 | 3.9591E−06 |

| 12th surface | | 13th surface | |
|---|---|---|---|
| κ | 0.0000E+00 | κ | 0.0000E+00 |
| A4 | −5.7151E−04 | A4 | −6.9556E−04 |
| A6 | 3.8268E−05 | A6 | 4.9505E−05 |
| A8 | −1.9666E−06 | A8 | −2.2565E−06 |

TABLE 1-continued

Example 1

| A10 | 1.0498E−08 | A10 | 8.5434E−09 |
|---|---|---|---|
| A12 | 2.4931E−10 | A12 | 4.7318E−10 |

Stop position: 0.50 mm forward from 5th surface

| Focal length | f = | | 6.49-18.5 |
|---|---|---|---|
| F-number | F | | 3.18-5.56 |
| Angle of view (°) | 2ω = | | 62.4-22.6 |

| Focal length | A | B | C |
|---|---|---|---|
| W | 6.49 | 15.48 | 5.60 | 2.26 |
| M | 11.47 | 6.53 | 10.40 | 2.41 |
| T | 18.50 | 2.11 | 17.38 | 2.61 |

The zoom lens of the Example 1 contains a first lens group G1 having negative refractive power, a second lens group G2 having aperture stop S and positive refractive power, and a third lens group G3, arranged in that order as viewed from the object side along the optical axis. The first lens group G1 includes a negative lens L1 (also referred to as negative lens 1a) and a positive lens L2 arranged in that order as viewed from the object. The second lens group G2 contains a cemented lens L45 further including a positive lens L3 (also referred to as lens 21 lens), a positive lens L4 (also referred to as lens 22) and a negative lens L5 (also referred to as lens 23), and a lens L6, arranged in that order as viewed from the object. The third lens group G3 is made of only one positive lens L7. The negative lens L1, lens L6 and positive lens L7 are polyolefinic plastic lenses. The positive lens L2 is a polyester based plastic lens. In the meantime, the positive lens L3, positive lens L4, and negative lens L5 are composed of the glass-made spherical surface lens finished by polishing. Further, a low-pass filter LPF with the optical surface provided with infrared cut coating and a seal glass SG for covering the image pickup surface of the solid-state image sensor CCD are arranged between the third lens group G3 and the image pickup surface of the solid-state image sensor CCD. In this Example, the position of the aspherical surface is positioned as shown above, without the present invention being restricted thereto.

At the time of zooming from the wide-angle end to the telephoto end, the first lens group G1 moves toward the image, as shown by arrow mark A, and then moves toward the object. The second lens group G2 moves toward the object as shown by arrow mark B, and the third lens group G3 moves toward the object as indicated by arrow mark C. At the time of zooming from the wide-angle side to the telephoto side, the distance between lens groups can be adjusted in such a way as to ensure that the distance between the first lens group G1 and second lens group G2 is decreased, and the distance between the second lens group G2 and third lens group G3 is increased. At the time of focusing, the first lens group G1 or third lens group G3 moves along the optical axis.

EXAMPLE 2

Figure 4:
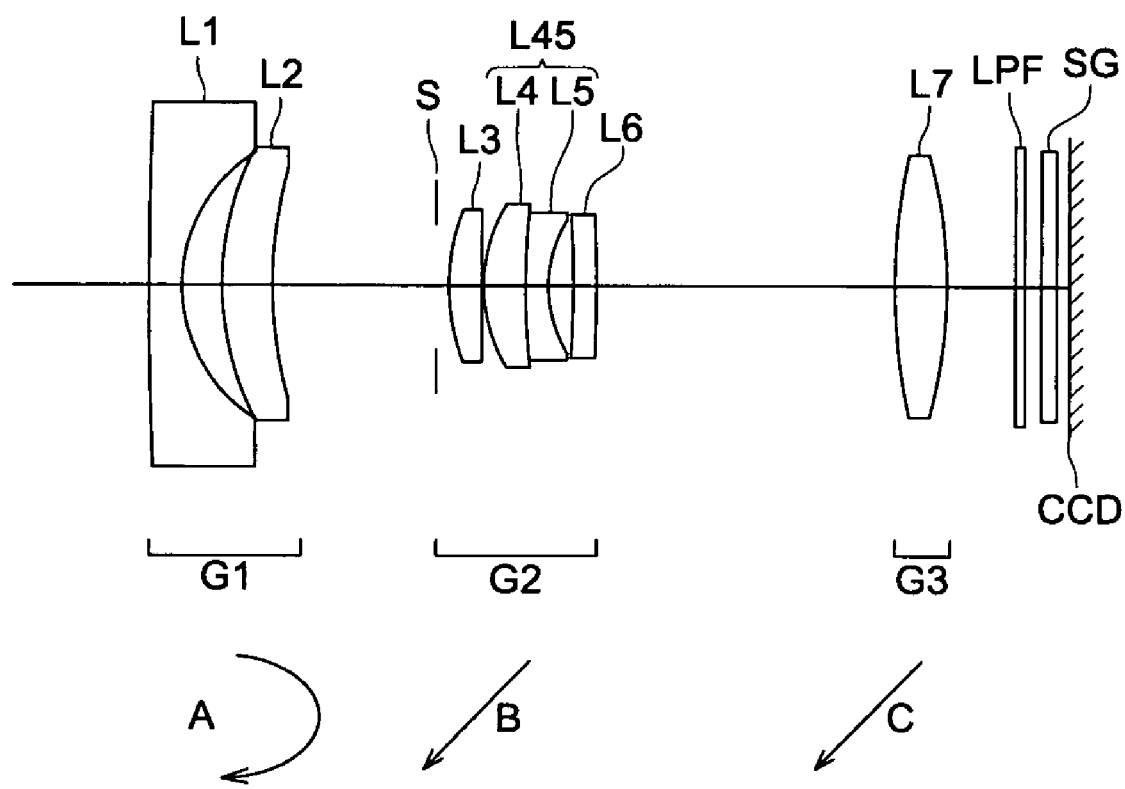
FIG. 4 is a cross sectional view of the zoom lens of Example 2.
Figures 1, 5A:
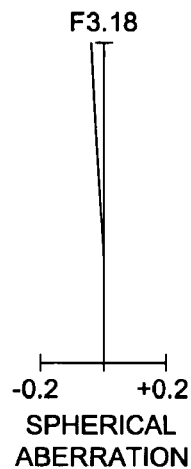
Figures 2, 5A:
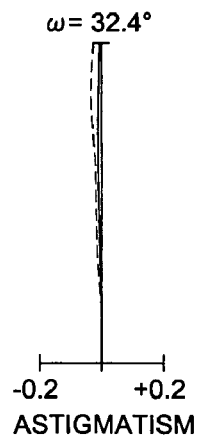
Figures 3, 5A:
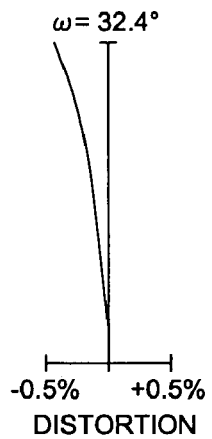
Figures 1, 5B:
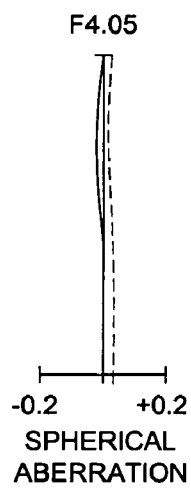
Figures 2, 5B:
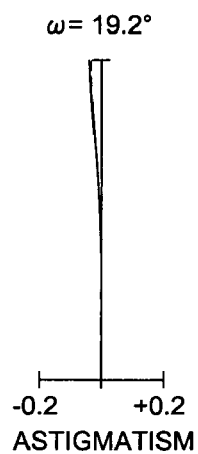
Figures 3, 5B:
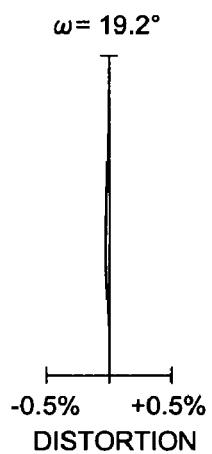
Figures 1, 5C:
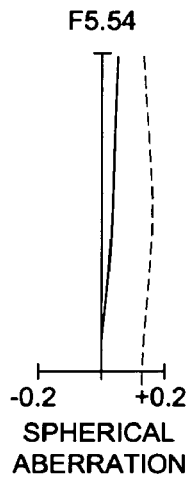
Figures 2, 5C:
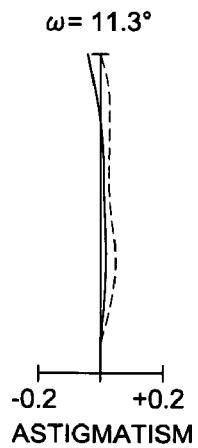
Figures 3, 5C:
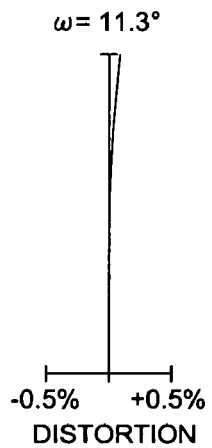

Table 2 shows the lens data of the zoom lens of Example 2. FIG. 4 is a cross sectional view of the zoom lens of Example 2. FIGS. 5(A)-1 through 5(C)-3 represent the aberration curves for spherical aberration, astigmatism, and distortion of the zoom lens of Example 2. FIGS. 5(A)-1 to 5(A)-3 shows the aberration curves on the wide-angle end. FIGS. 5(B)-1 through 5(B)-3 indicate intermediate aberration curves. FIGS. 5(C)-1 through 5(C)-3 show aberration curves on the telephoto end.

TABLE 2

Example 2

| | r | d | nd | vd |
|---|---|---|---|---|
| 1 | 138.0594 | 1.20 | 1.525 | 56.0*1 |
| 2 | 4.883769 | 1.87 | | |
| 3 | 7.282316 | 1.83 | 1.607 | 27.1*2 |
| 4 | 12.94338 | A | | |
| 5 | 9.078652 | 1.18 | 1.816 | 46.6 |
| 6 | 2104.713 | 0.15 | | |
| 7 | 5.382917 | 1.45 | 1.729 | 54.7 |
| 8 | 18.10209 | 0.80 | 1.846 | 23.8 |
| 9 | 4.200501 | 0.96 | | |
| 10 | −18.56556 | 0.80 | 1.525 | 56.0*3 |
| 11 | −20.20602 | B | | |
| 12 | 15.80863 | 1.81 | 1.525 | 56.0*4 |
| 13 | −19.58778 | C | | |
| 14 | ∞ | 0.39 | 1.548 | 66.7 |
| 15 | ∞ | 0.67 | | |
| 16 | ∞ | 0.50 | 1.516 | 64.1 |
| 17 | ∞ | | | |

| 1st surface | | 2nd surface | |
|---|---|---|---|
| κ | 0.0000E+00 | κ | −2.0284E−01 |
| A4 | 3.3634E−04 | A4 | −6.8085E−05 |
| A6 | −4.5850E−06 | A6 | 9.9552E−06 |
| A8 | −1.7208E−07 | A8 | −2.1839E−07 |
| A10 | 3.8682E−09 | A10 | −6.1996E−08 |
| A12 | −1.5740E−11 | A12 | −1.3003E−09 |
| | | A14 | 6.5609E−11 |

| 3rd surface | | 4th surface | |
|---|---|---|---|
| κ | −1.2694E+00 | κ | 0.0000E+00 |
| A4 | −1.4159E−04 | A4 | −5.2258E−04 |
| A6 | 1.2876E−05 | A6 | 5.4786E−07 |
| A8 | −1.2516E−06 | A8 | −2.1777E−06 |
| A10 | −3.0164E−10 | A10 | 9.9885E−05 |
| A12 | 3.0970E−10 | A12 | −1.8636E−09 |

| 10th surface | | 11th surface | |
|---|---|---|---|
| κ | 2.0000E+01 | κ | −6.9636E+00 |
| A4 | 4.6550E−04 | A4 | 1.2655E−03 |
| A6 | 3.1665E−04 | A6 | 2.4172E−04 |
| A8 | −8.6053E−05 | A8 | −4.0599E−05 |
| A10 | 1.0160E−05 | A10 | 4.7609E−06 |

| 12th surface | | 13th surface | |
|---|---|---|---|
| κ | 0.0000E+00 | κ | 0.0000E+00 |
| A4 | −5.7455E−04 | A4 | −5.6438E−04 |
| A6 | 4.6364E−05 | A6 | 4.5682E−05 |
| A8 | −2.3031E−05 | A8 | −1.4067E−06 |
| A10 | 1.8261E−08 | A10 | −4.2062E−08 |
| A12 | 1.0609E−09 | A12 | 2.3185E−09 |

Stop position: 0.50 mm forward from 5th surface

| Focal length | f = | 6.15-18.2 |
| F-number | F | 3.18-5.54 |
| Angle of view (°) | 2ω = | 62.4-22.6 |

| Focal length | A | B | C |
|---|---|---|---|
| W | 6.15 | 17.13 | 4.85 | 2.49 |
| M | 10.64 | 7.49 | 9.02 | 2.70 |
| T | 18.20 | 2.11 | 16.42 | 2.90 |

The zoom lens of the Example 2 contains a first lens group G1 having negative refractive power, a second lens group G2 having aperture stop S and positive refractive power, and a third lens group G3, arranged in that order as viewed from the object side along the optical axis. The first lens group G1 includes a negative lens L1 (also referred to as negative lens 1a) and a positive lens L2 arranged in that order as viewed from the object. The second lens group G2 contains a cemented lens L45 further including a positive lens L3 (also referred to as lens 21 lens), a positive lens L4 (also referred to as lens 22) and a negative lens L5 (also referred to as lens 23), and a lens L6, arranged in that order as viewed from the object. The third lens group G3 is made of only one positive lens L7. The negative lens L1, lens L6 and positive lens L7 are polyolefinic plastic lenses. The positive lens L2 is a polyester based plastic lens. In the meantime, the positive lens L3, positive lens L4, and negative lens L5 are composed of the glass-made spherical surface lens finished by polishing. Further, a low-pass filter LPF with the optical surface provided with infrared cut coating and a seal glass SG for covering the image pickup surface of the solid-state image sensor CCD are arranged between the third lens group G3 and the image pickup surface of the solid-state image sensor CCD. In this Example, the position of the aspherical surface is positioned as shown above, without the present invention being restricted thereto.

At the time of zooming from the wide-angle end to the telephoto end, the first lens group G1 moves toward the image, as shown by arrow mark A, and then moves toward the object. The second lens group G2 moves toward the object as shown by arrow mark B, and the third lens group G3 moves toward the object as indicated by arrow mark C. At the time of zooming from the wide-angle side to the telephoto side, the distance between lens groups can be adjusted in such a way as to ensure that the distance between the first lens group G1 and second lens group G2 is decreased, and the distance between the second lens group G2 and third lens group G3 is increased. At the time of focusing, the first lens group G1 or third lens group G3 moves along the optical axis.

EXAMPLE 3

Figure 6:
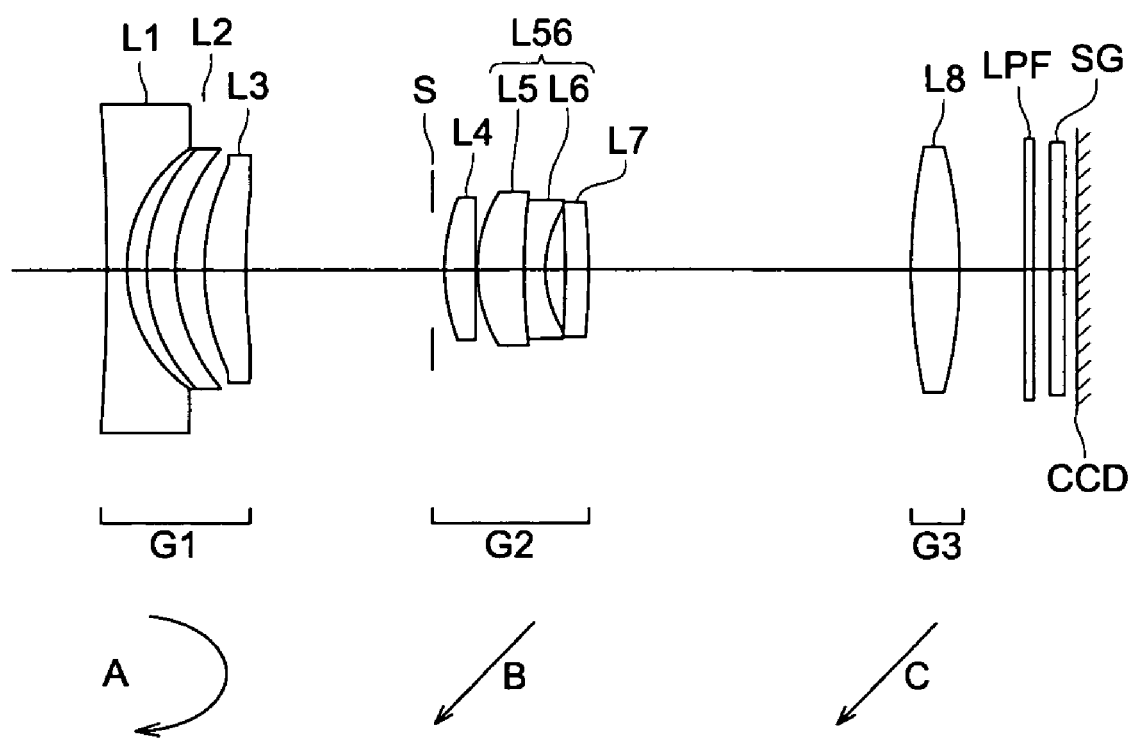
FIG. 6 is a cross sectional view of the zoom lens of Example 3.
Figures 1, 7A:
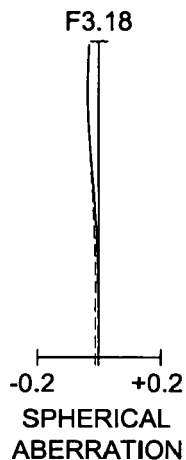
Figures 2, 7A:
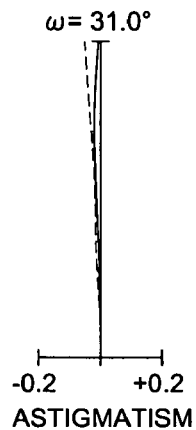
Figures 3, 7A:
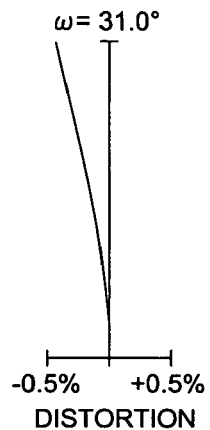
Figures 1, 7B:
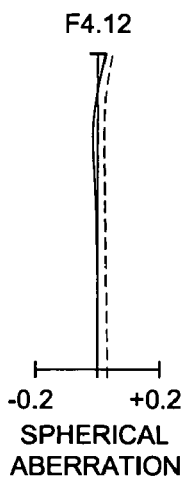
Figures 2, 7B:
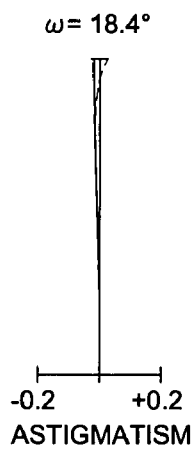
Figures 3, 7B:
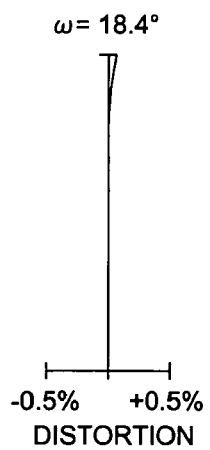
Figures 1, 7C:
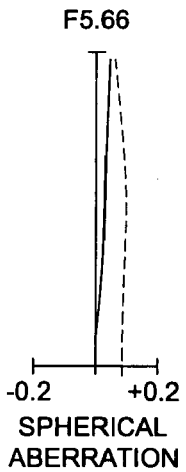
Figures 2, 7C:
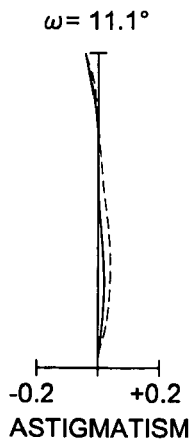
Figures 3, 7C:
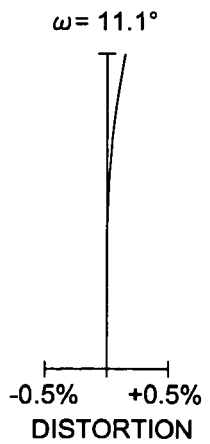

Table 3 shows the lens data of the zoom lens of Example 3. FIG. 6 is a cross sectional view of the zoom lens of Example 3. FIGS. 7(A)-1 through 7(C)-3 represent the aberration curves for spherical aberration, astigmatism, and distortion of the zoom lens of Example 3. FIGS. 7(A)-1 to 7(A)-3 shows the aberration curves on the wide-angle end. FIGS. 7(B)-1 through 7(B)-3 indicate intermediate aberration curves. FIGS. 7(C)-1 through 7(C)-3 show aberration curves on the telephoto end.

TABLE 3

Example 3

| | r | d | nd | vd |
|---|---|---|---|---|
| 1 | −117.3254 | 0.80 | 1.525 | 56.0*1 |
| 2 | 4.754831 | 0.81 | | |
| 3 | 6.039854 | 0.98 | 1.525 | 56.0*2 |
| 4 | 5.23953 | 1.09 | | |
| 5 | 7.833425 | 1.47 | 1.607 | 27.1*3 |
| 6 | 20.44105 | A | | |
| 7 | 9.693716 | 1.20 | 1.883 | 40.8 |
| 8 | 210.6929 | 0.20 | | |
| 9 | 5.359257 | 1.50 | 1.730 | 54.7 |
| 10 | 30.40548 | 0.90 | 1.847 | 23.8 |
| 11 | 4.156421 | 1.00 | | |
| 12 | −17.35794 | 0.90 | 1.525 | 56.0*4 |
| 13 | −14.34706 | B | | |
| 14 | 19.59119 | 1.70 | 1.525 | 56.0*5 |
| 15 | −12.83547 | C | | |
| 16 | ∞ | 0.39 | 1.548 | 66.7 |

TABLE 3-continued

Example 3

| 17 | ∞ | 0.67 | | |
| 18 | ∞ | 0.50 | 1.516 | 64.1 |
| 19 | ∞ | | | |

| 2nd surface | | 4th surface | |
| --- | --- | --- | --- |
| κ | −8.9970E−01 | κ | 0.0000E+00 |
| A4 | 6.6468E−04 | A4 | −2.5108E−04 |
| A6 | 1.9894E−05 | A6 | −4.3875E−05 |
| A8 | 7.4559E−07 | A8 | −1.3435E−06 |
| A10 | 1.8635E−08 | A10 | −4.3985E−09 |
| A12 | −3.3158E−09 | A12 | 1.4210E−09 |
| A14 | 6.8846E−11 | | |

| 5th surface | | 6th surface | |
| --- | --- | --- | --- |
| κ | 0.0000E+00 | κ | 0.0000E+00 |
| A4 | −4.6698E−05 | A4 | −2.6621E−04 |
| A6 | −1.9243E−05 | A6 | −1.0389E−05 |
| A8 | −1.3691E−06 | A8 | −6.0923E−07 |
| A10 | −4.7759E−08 | A10 | −1.5691E−07 |
| A12 | −2.4043E−09 | A12 | 3.1382E−09 |

| 12th surface | | 13th surface | |
| --- | --- | --- | --- |
| κ | 0.0000E+00 | κ | 0.0000E+00 |
| A4 | −3.7038E−04 | A4 | 8.3584E−04 |
| A6 | 8.1334E−05 | A6 | 6.8145E−05 |
| A8 | 1.0256E−05 | A8 | 2.3787E−05 |
| A10 | −2.0650E−06 | A10 | −2.6671E−06 |

| 14th surface | | 15th surface | |
| --- | --- | --- | --- |
| κ | 0.0000E+00 | κ | 0.0000E+00 |
| A4 | −6.1976E−04 | A4 | −4.9994E−04 |
| A6 | 3.4854E−05 | A6 | 4.8978E−05 |
| A8 | −2.8653E−06 | A8 | −3.5923E−06 |
| A10 | 9.9452E−08 | A10 | 1.1579E−07 |

Stop position: 0.50 mm forward from 5th surface

| Focal length | f = | 6.50-18.54 |
| F-number | F | 3.18-5.66 |
| Angle of view (°) | 2ω = | 62.0-22.2 |

| Focal length | A | B | C |
| --- | --- | --- | --- |
| W | 6.50 | 13.87 | 6.72 | 1.97 |
| M | 11.00 | 6.60 | 11.68 | 2.07 |
| T | 18.54 | 2.11 | 20.17 | 2.64 |

The zoom lens of the Example 3 contains a first lens group G1 having negative refractive power, a second lens group G2 having aperture stop S and positive refractive power, and a third lens group G3, arranged in that order as viewed from the object side along the optical axis. The first lens group G1 includes a negative lens L1 (also referred to as negative lens 1a), a negative lens L2 and a positive lens L3 arranged in that order as viewed from the object. The second lens group G2 contains a cemented lens L56 further including a positive lens L4 (also referred to as lens 21 lens), a positive lens L5 (also referred to as lens 22) and a negative lens L6 (also referred to as lens 23), and a lens L7, arranged in that order as viewed from the object. The third lens group G3 is made of only one positive lens L8. The negative lens L1, negative lens L2, lens L7 and positive lens L8 are polyolefinic plastic lenses. The positive lens L3 is a polyester based plastic lens. In the meantime, the positive lens L4, positive lens L5, and negative lens L6 are composed of the glass-made spherical surface lens finished by polishing. Further, a low-pass filter LPF with the optical surface provided with infrared cut coating and a seal glass SG for covering the image pickup surface of the solid-state image sensor CCD are arranged between the third lens group G3 and the image pickup surface of the solid-state image sensor CCD. In this Example, the position of the aspherical surface is positioned as shown above, without the present invention being restricted thereto.

At the time of zooming from the wide-angle end to the telephoto end, the first lens group G1 moves toward the image, as shown by arrow mark A, and then moves toward the object. The second lens group G2 moves toward the object as shown by arrow mark B, and the third lens group G3 moves toward the object as indicated by arrow mark C. At the time of zooming from the wide-angle side to the telephoto side, the distance between lens groups can be adjusted in such a way as to ensure that the distance between the first lens group G1 and second lens group G2 is decreased, and the distance between the second lens group G2 and third lens group G3 is increased. At the time of focusing, the first lens group G1 or third lens group G3 moves along the optical axis.

EXAMPLE 4

Figure 8:
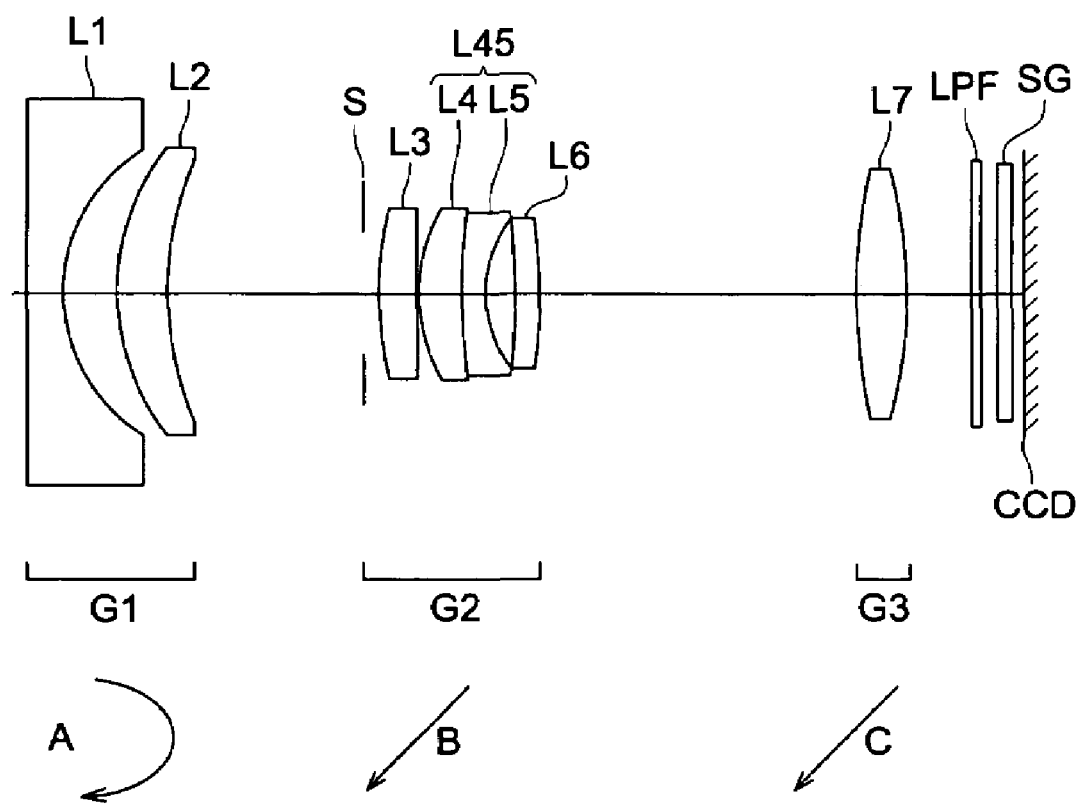
FIG. 8 is a cross sectional view of the zoom lens of Example 4.
Figures 1, 9A:
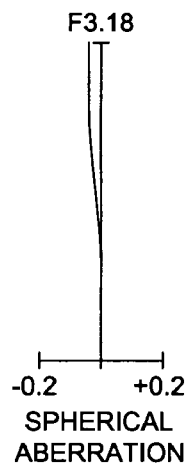
Figures 2, 9A:
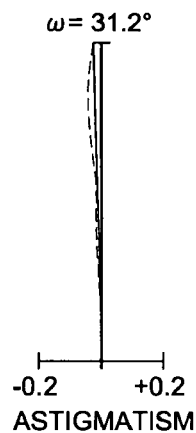
Figures 3, 9A:
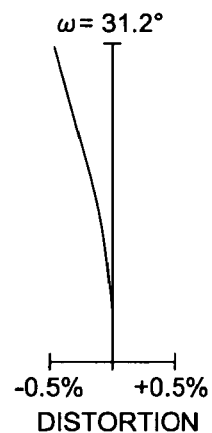
Figures 1, 9B:
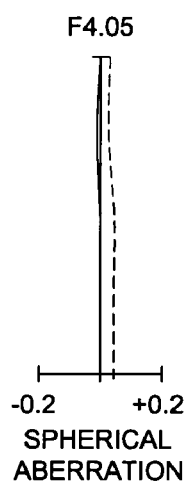
Figures 2, 9B:
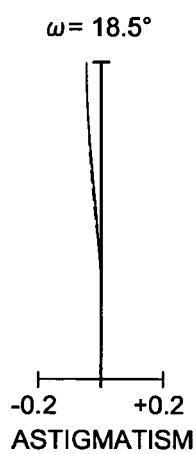
Figures 3, 9B:
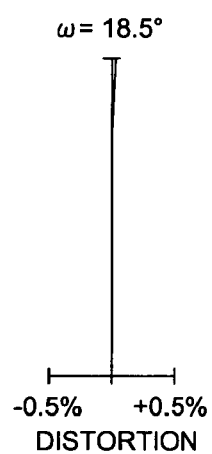
Figures 1, 9C:
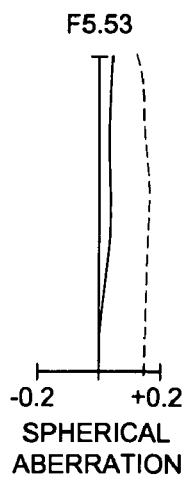
Figures 2, 9C:
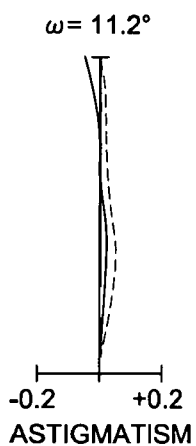
Figures 3, 9C:
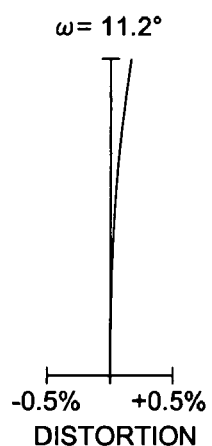

Table 4 shows the lens data of the zoom lens of Example 4. FIG. 8 is a cross sectional view of the zoom lens of Example 4. FIGS. 9(A)-1 through 9(C)-3 represent the aberration curves for spherical aberration, astigmatism, and distortion of the zoom lens of Example 4. FIGS. 9(A)-1 to 9(A)-3 shows the aberration curves on the wide-angle end. FIGS. 9(B)-1 through 9(B)-3 indicate intermediate aberration curves. FIGS. 9(C)-1 through 9(C)-3 show aberration curves on the telephoto end. In the following aberration curves, a solid line indicates line d, and a dot denotes line g for spherical aberration curves. For aspherical aberration curves, a solid line indicates a sagittal image surface and a dot indicates a meridional image surface.

TABLE 4

Example 4

| | r | d | nd | νd |
| --- | --- | --- | --- | --- |
| 1 | −835.437 | 1.2 | 1.525 | 56.0*1 |
| 2 | 4.701 | 1.88 | | |
| 3 | 7.407 | 1.74 | 1.699 | 30.1 |
| 4 | 13.260 | A | | |
| 5 | 11.360 | 1.18 | 1.816 | 46.6 |
| 6 | −56.655 | 0.15 | | |
| 7 | 4.969 | 1.45 | 1.729 | 54.7 |
| 8 | 15.453 | 0.8 | 1.847 | 23.8 |
| 9 | 4.038 | 0.96 | | |
| 10 | −16.688 | 0.8 | 1.525 | 56.0*2 |
| 11 | −22.467 | B | | |
| 12 | 14.131 | 1.81 | 1.525 | 56.0*3 |
| 13 | −16.407 | C | | |
| 14 | ∞ | 0.39 | 1.549 | 67.0 |
| 15 | ∞ | 0.67 | | |
| 16 | ∞ | 0.5 | 1.516 | 64.1 |
| 17 | ∞ | | | |
| 18 | ∞ | | | |

| 1st surface | | 2nd surface | |
| --- | --- | --- | --- |
| κ | 0.00E+00 | κ | −1.3530E−01 |
| A4 | −1.5558E−04 | A4 | −6.2698E−04 |
| A6 | 6.1766E−06 | A6 | −1.1759E−05 |
| A8 | 5.5896E−08 | A8 | 1.7020E−07 |
| A10 | −6.9081E−09 | A10 | −4.0576E−08 |
| A12 | 9.8435E−11 | A12 | 1.4775E−09 |
| | | A14 | −1.0608E−10 |

TABLE 4-continued

Example 4

| | 10th surface | | 11th surface |
|---|---|---|---|
| κ | 1.8160E+01 | κ | −2.0000E+01 |
| A4 | 1.1467E−03 | A4 | 1.5821E−03 |
| A6 | 2.5684E−04 | A6 | 1.6778E−04 |
| A8 | −7.4700E−05 | A8 | −2.4279E−05 |
| A10 | 1.0449E−05 | A10 | 4.0813E−06 |

| | 12th surface | | 13th surface |
|---|---|---|---|
| κ | 0.0000E+00 | κ | 0.0000E+00 |
| A4 | −4.4939E−04 | A4 | −2.7600E−04 |
| A6 | 2.8532E−05 | A6 | 2.4253E−05 |
| A8 | −2.2036E−06 | A8 | −1.6409E−06 |
| A10 | 5.9952E−08 | A10 | 3.2566E−08 |
| A12 | −1.2596E−09 | A12 | −6.8583E−10 |

Stop position: 0.50 mm forward from 5th surface

| Focal length | f = | 6.49-18.5 |
|---|---|---|
| F-number | F | 3.18-5.54 |
| Angle of view (°) | 2ω= | 62.4-22.4 |

| Focal length | A | B | C |
|---|---|---|---|
| W | 6.49 | 15.67 | 6.12 | 1.87 |
| M | 11.00 | 7.07 | 10.49 | 2.02 |
| T | 18.50 | 2.11 | 18.00 | 2.21 |

The zoom lens of the Example 4 contains a first lens group G1 having negative refractive power, a second lens group G2 having aperture stop S and positive refractive power, and a third lens group G3, arranged in that order as viewed from the object side along the optical axis. The first lens group G1 includes a negative lens L1 (also referred to as negative lens 1a) and a positive lens L2 arranged in that order as viewed from the object. The second lens group G2 contains a cemented lens L45 further including a positive lens L3 (also referred to as lens 21 lens), a positive lens L4 (also referred to as lens 22) and a negative lens L5 (also referred to as lens 23), and a lens L6, arranged in that order as viewed from the object. The third lens group G3 is made of only one positive lens L7. The negative lens L1, lens L6 and positive lens L7 are polyolefinic plastic lenses. In the meantime, the positive lens L2, positive lens L3, positive lens L4, and negative lens L5 are composed of the glass-made spherical surface lens finished by polishing. Further, a low-pass filter LPF with the optical surface provided with infrared cut coating and a seal glass SG for covering the image pickup surface of the solid-state image sensor CCD are arranged between the third lens group G3 and the image pickup surface of the solid-state image sensor CCD. In this Example, the position of the aspherical surface is positioned as shown above, without the present invention being restricted thereto.

At the time of zooming from the wide-angle end to the telephoto end, the first lens group G1 moves toward the image, as shown by arrow mark A, and then moves toward the object. The second lens group G2 moves toward the object as shown by arrow mark B, and the third lens group G3 moves toward the object as indicated by arrow mark C. At the time of zooming from the wide-angle side to the telephoto side, the distance between lens groups can be adjusted in such a way as to ensure that the distance between the first lens group G1 and second lens group G2 is decreased, and the distance between the second lens group G2 and third lens group G3 is increased. At the time of focusing, the first lens group G1 or third lens group G3 moves along the optical axis.

In the aforementioned Example, plastic lenses are used as the negative lens L1, positive lens L2, negative lens L6 and positive lens L7 in Examples 1 and 2; as the negative lens L1, negative lens L2, positive lens L3, lens L7 and positive lens L8 in Example 3; and as the negative lens L1, lens L6 and positive lens L7 in Example 4. The plastic material is characterized by a great change in refractive index in response to a change in temperature. When there is a change in the ambient temperature, the image point position of the entire image pickup lens system will be subject to fluctuation, thereby raising a new problem. In the case of a zoom lens, the focus group is generally moved along the optical axis to correct the fluctuation in the image point position. However, the fluctuation in the image point position at the time of temperature change does not create any problem. However, the movement of the focus group may cause deterioration of aberration including color aberration and image surface curvature. In such cases, the problem of temperature characteristics can be solved to some extent in Example 1, for example, by using the negative lens L1 and positive lens L2 to distribute the refractive power in such a way as to offset the fluctuation in the image point position in response to temperature change to some extent.

It has become apparent in recent years that a change in the plastic material temperature can be reduced by mixing inorganic particles into the plastic material. To be more specific, when the transparent plastic material is mixed with particles, light will start scattering and transmittance will be reduced. Accordingly, it has been difficult to use this material as an optical material, in the conventional art. However, it is virtually possible to prevent scattering from taking plate by making the size of the particles smaller than the wavelength of the transmitted light flux. The refractive index of the plastic material is reduced by the rise in temperature, whereas the refractive index of the inorganic particles rises with the temperature. Thus, this dependency on temperature can be utilized to cause mutual cancellation in such a way that there will be virtually no change in refractive index. To put it more specifically, if inorganic particles having a maximum length of 20 nanometers are dispersed in the plastic material as a base material, it is possible to get the plastic material characterized by the refractive index of very low dependency on temperature. For example, niobium oxide ($Nb_2O_5$) dispersed in acryl reduces a change in refractive index due to temperature change.

The following describes the details of the change in refractive index in response to temperature change (dependency on temperature). The change A in refractive index in response to temperature change is obtained by differentiating the refractive index n with respect to temperature t according to the Lorentz-Lorenz equation. This can be expressed by Mathematical Formula 2.

$$A = \frac{(n^2+2)(n^2-1)}{6n}\left\{(-3\alpha) + \frac{1}{[R]}\frac{\partial [R]}{\partial t}\right\} \quad \text{[Mathematical Formula 2]}$$

α: coefficient of linear expansion
R: Molecular refraction

In the plastic material, contribution of the second item is generally smaller than that of the first item in the formula, and can be neglected substantially. For example, in the case of the PMMA resin, the coefficient of linear expansion α is $7\times10^{-5}$. When it is substituted into the following formula, $A=-1.2\times10^{-4}$[/° C.]. This is almost the same as the actual measurement value.

To put it more specifically, the change A in refractive index equivalent to about $-1.2\times10^{-4}$[/° C.] is preferably kept below $8\times10^{-5}$[/° C.] in terms of absolute value, more preferably below $6\times10^{-5}$[/° C.] in terms of absolute value.

Table 5 shows the change A (=dn/dT) in refractive index of the plastic material to which the present invention can be applied.

TABLE 5

| Plastic material | A (approximate value)[$10^{-5}$/° C.] |
|---|---|
| Polyester | −14 |
| Polyolefin | −12 |
| Polycarbonate | −14 |

The zoom lens of Example 1 will be used to show the difference in the amount of back focus change with respect to temperature change between the two cases when the plastic lens with the following particles dispersed therein is used, and when this plastic is not used.

Table 6 shows a change of refractive index nd in response to temperature. This table indicates the amounts of back focus change ($\Delta fB_W$ and $\Delta fB_T$) at each of the wide-angle end and telephoto end for the temperature rise of +30° C. from the normal temperature of 20° C., and the amounts of back focus change ($\Delta fB_W$, $\Delta fB_T$) at each of the wide-angle end and telephoto end for the temperature fall of −30° C.

TABLE 6

| | A [/° C.] | Refractive index at normal temperature | Refractive index at normal temperature plus 30° C. | Refractive index at normal temperature minus 30° C. |
|---|---|---|---|---|
| 1st lens | $-8 \times 10^{-5}$ | 1.525 | 1.5226 | 1.5274 |
| | $-6 \times 10^{-5}$ | | 1.5232 | 1.5268 |
| 2nd lens | $-8 \times 10^{-5}$ | 1.607 | 1.6046 | 1.6094 |
| | $-6 \times 10^{-5}$ | | 1.6052 | 1.6088 |
| 6th lens | $-8 \times 10^{-5}$ | 1.525 | 1.5226 | 1.5274 |
| | $-6 \times 10^{-5}$ | | 1.5232 | 1.5268 |
| 7th lens | $-8 \times 10^{-5}$ | 1.525 | 1.5226 | 1.5274 |
| | $-6 \times 10^{-5}$ | | 1.5232 | 1.5268 |

| | +30° C. | | −30° C. | |
|---|---|---|---|---|
| A [/° C.] | $\Delta fB_W$ [mm] | $\Delta fB_T$ [mm] | $\Delta fB_W$ [mm] | $\Delta fB_T$ [mm] |
| $-8 \times 10^{-5}$ | −0.009 | −0.094 | +0.009 | +0.094 |
| $-6 \times 10^{-5}$ | −0.007 | −0.071 | +0.007 | +0.071 |

For the sake of comparison, Tables 7 and 8 show a change in refractive index nd in response to temperature change, the amounts of back focus change ($\Delta fB_W$ and $\Delta fB_T$) at each of the wide-angle end and telephoto end for the temperature rise of +30° C. from the normal temperature of 20° C., and the amounts of back focus change ($\Delta fB_W$, $\Delta fB_T$) at each of the wide-angle end and telephoto end for the temperature fall of −30° C. They are based on the assumption that all the plastic lenses do not include the aforementioned particles in the zoom lens system of the present Example.

TABLE 7

| | A [/° C.] | Refractive index at normal temperature | Refractive index at normal temperature plus 30° C. | Refractive index at normal temperature minus 30° C. |
|---|---|---|---|---|
| 1st lens | $-12 \times 10^{-5}$ | 1.525 | 1.5214 | 1.5286 |
| 2nd lens | $-14 \times 10^{-5}$ | 1.607 | 1.6027 | 1.6113 |
| 6th lens | $-12 \times 10^{-5}$ | 1.525 | 1.5214 | 1.5286 |
| 7th lens | $-12 \times 10^{-5}$ | 1.525 | 1.5214 | 1.5286 |

TABLE 8

| +30° C. | | −30° C. | |
|---|---|---|---|
| $\Delta fB_W$ [mm] | $\Delta fB_T$ [mm] | $\Delta fB_W$ [mm] | $\Delta fB_T$ [mm] |
| −0.020 | −0.173 | +0.020 | +0.169 |

Based on the aforementioned discussion, comparison was made with the case where the aforementioned particles were not included at all. When the plastic materials dispersed with the aforementioned particles were used to produce the first lens L1, second lens L2, sixth lens L6 and seventh lens L7, and $A=-6\times10^{-5}$/° C., it was possible to reduce the amount of back focus change ($\Delta fB_T$) below 50 percent at the telephoto end at the time of temperature change.

It is also possible to use the plastic material dispersed with the aforementioned particles having change A in refractive indexes according to temperature change, which is different for each of the first lens L1, second lens L2, sixth lens L6 and seventh lens L7. In this case, the optimum value A is selected with due consideration given to the degree of the contribution to the fluctuation of the image point position at the time of temperature change. This will completely eliminate the possibility of fluctuation of the image point position in the entire image pickup lens at the time of temperature change. The same discussion applies to the Examples 2, 3 and 4.

Table 9 summarizes the values of the Equations (1) through (5) corresponding to the aforementioned Examples.

TABLE 9

| | Equation (1) $|f1/fw|$ | Equation (2) $|f1a/fw|$ | Equation (3) $|f21/f2|$ | Equation (4) $|f2/fw|$ | Equation (5) $|f3/fw|$ |
|---|---|---|---|---|---|
| Example 1 | 2.44 | 1.44 | 0.99 | 1.76 | 2.64 |
| Example 2 | 2.70 | 1.58 | 0.97 | 1.89 | 2.73 |
| Example 3 | 2.11 | 1.33 | 1.02 | 1.72 | 2.32 |
| Example 4 | 2.49 | 1.37 | 1.01 | 1.78 | 2.27 |

The present invention provides a compact, high-quality zoom lens suited particularly to a digital camera by means of effective distribution of the plastic lenses.

What is claimed is:

1. A zoom lens comprising in the order from an object:
   (a) a first lens group having a negative refractive power, including at least one negative lens and one positive lens, wherein a negative plastic lens having one or more aspherical surfaces is arranged on a side closest to the object;
   (b) a second lens group having positive refractive power, including a first positive lens, a second positive lens and a negative lens in the order from the object; and (c) a third lens group, wherein each lens group is moved in a direction of an optical axis of the zoom lens to vary power thereof, and the following expressions are satisfied:

$$2.0 < |f1/fw| < 3.0$$

$$1.2 < |f1a/fw| < 1.8$$

where f1 represents a focal length of the first lens group, f1$a$ represents a focal length of the negative plastic lens arranged closest to the object, and fw represents a focal length at a wide-angle end of an entire zoom lens.

2. The zoom lens of claim 1, wherein the first lens group consists of one negative lens and one positive lens.

3. The zoom lens of claim 1, wherein the first lens group consists of two negative lenses and one positive lens.

4. The zoom lens of claim 1, wherein the positive lens of the first lens group is a plastic lens.

5. The zoom lens of claim 1, wherein the first lens group consists of the plastic lens.

6. The zoom lens of claim 1, wherein the first positive lens, the second positive lens and the negative lens of the second lens group are glass-made spherical surface lenses finished by polishing.

7. The zoom lens of claim 1, wherein the following expression is satisfied:

$$0.5 < |f21/f2| < 1.5$$

where f21 represents a focal length of the first positive lens of the second lens group and f2 represents a focal length of the second lens group.

8. The zoom lens of claim 1, wherein the second lens group has a cemented lens formed by bonding the second positive lens with the negative lens.

9. The zoom lens of claim 1, wherein the second lens group has a plastic lens containing an aspherical surface on at least one surface of the second lens group closest to an image.

10. The zoom lens of claim 1, wherein the following expression is satisfied:

$$1.5 < |f2/fw| < 2.5$$

where f2 represents a focal length of the second lens group.

11. The zoom lens of claim 1, wherein the third lens group has positive refractive power.

12. The zoom lens of claim 1, wherein the third lens group has at least one plastic lens.

13. The zoom lens of claim 1, wherein the third lens group consists of one positive lens.

14. The zoom lens of claim 1, wherein the following expression is satisfied:

$$2.0 < |f3/fw| < 5.0$$

where f3 represents a focal length of the third lens group.

15. The zoom lens of claim 1, wherein each of the lens groups has at least one plastic lens which contains at least one aspherical surface.

16. The zoom lens of claim 1, wherein a distance between the adjoining lens groups is changed to vary power so that a distance between the first lens group and the second lens group is reduced, and a distance between the second lens group and the third lens group is increased, when power is varied from a wide angle side to a telephoto side.

17. The zoom lens of claim 1, wherein the third lens group moves forward to the object along the optical axis when power is varied from a wide angle side to a telephoto side.

18. The zoom lens of claim 1, wherein focusing is carried out from an object at infinity to an object at short distance by moving the first lens group or the third lens group along the optical axis.

19. The zoom lens of claim 1, wherein a zoom ratio is 2.8 or more.

* * * * *